(12) United States Patent
Feuerstein et al.

(10) Patent No.: US 9,098,624 B1
(45) Date of Patent: Aug. 4, 2015

(54) DEEP TYPE PARSING

(71) Applicant: Dell Software Inc., Aliso Viejo, CA (US)

(72) Inventors: Steven Eric Feuerstein, Chicago, IL (US); Leonid Khukhlovich, Skokie, IL (US)

(73) Assignee: Dell Software Inc., Aliso Viejo, CA (US)

(*) Notice: Subject to any disclaimer, the term of this patent is extended or adjusted under 35 U.S.C. 154(b) by 0 days.

(21) Appl. No.: 13/713,424

(22) Filed: Dec. 13, 2012

Related U.S. Application Data

(60) Provisional application No. 61/579,514, filed on Dec. 22, 2011.

(51) Int. Cl.
G06F 9/44 (2006.01)
G06F 11/36 (2006.01)

(52) U.S. Cl.
CPC .................................. G06F 11/362 (2013.01)

(58) Field of Classification Search
CPC ............ G06F 11/3664; G06F 17/2705; G06F 17/30607; G06F 17/30619
See application file for complete search history.

(56) References Cited

U.S. PATENT DOCUMENTS

| | | | |
|---|---|---|---|
| 4,931,928 A | 6/1990 | Greenfeld | |
| 5,706,506 A * | 1/1998 | Jensen et al. ........................ | 1/1 |
| 6,108,659 A | 8/2000 | Vincent | |
| 6,493,635 B1 * | 12/2002 | Bevc et al. ...................... | 702/14 |
| 7,171,588 B2 * | 1/2007 | Friedman et al. .......... | 714/38.12 |
| 7,177,852 B2 | 2/2007 | Cui et al. | |
| 7,720,872 B1 | 5/2010 | Biere et al. | |
| 7,752,609 B2 | 7/2010 | Rioux | |
| 7,792,853 B2 | 9/2010 | Subbian et al. | |
| 7,917,457 B2 | 3/2011 | Marfatia et al. | |
| 2004/0060039 A1 * | 3/2004 | Fujikawa et al. ............. | 717/124 |
| 2004/0073904 A1 * | 4/2004 | Hill .................................. | 718/1 |
| 2006/0015856 A1 * | 1/2006 | Lotter .......................... | 717/136 |
| 2006/0026585 A1 * | 2/2006 | Haselden et al. ............. | 717/168 |
| 2010/0083240 A1 | 4/2010 | Siman | |
| 2010/0131925 A1 * | 5/2010 | Gutfleisch ..................... | 717/113 |
| 2011/0055806 A1 | 3/2011 | Chicherin et al. | |

(Continued)

OTHER PUBLICATIONS

Microsoft Press, "Microsoft Computer Dictionary", 2002, definition of "source code."*

(Continued)

*Primary Examiner* — Jue Louie
(74) *Attorney, Agent, or Firm* — Winstead PC

(57) ABSTRACT

A method for accessing variables in an application is described. The method includes accessing application source code and parsing the application source code to identify a set of variables. For each variable from the set of variables, the method can include determining a variable type of the variable. In response to determining that the variable type is a complex variable, the method can include parsing the complex variable, which can include repeating the method for each variable of the complex variable. In response to determining that the variable is associated with a database, the method can include resolving a variable name and determining whether the variable exists in a data dictionary associated with the database. The method can further include determining metadata associated with the variable based, at least in part, on the variable type. The variable type and metadata of the variable can then be presented to a user.

14 Claims, 5 Drawing Sheets

(56) References Cited

U.S. PATENT DOCUMENTS

2011/0197179 A1* 8/2011 Kratochvil ............... 717/125
2011/0307864 A1* 12/2011 Grechanik et al. ......... 717/124
2011/0307870 A1 12/2011 Stairs et al.

OTHER PUBLICATIONS

Stack Overflow, "Why is programming in bytecode not as popular or prevalent as programming in assembly?", May 2011, retrieved from: http://stackoverflow.com/questions/5925975/why-is-programming-in-bytecode-not-as-popular-or-prevalent-as-programming-in-ass.*

* cited by examiner

DEEP TYPE PARSING

RELATED APPLICATIONS

This disclosure claims priority to U.S. Provisional Application No. 61/579,514 filed Dec. 22, 2011 and entitled "DEEP TYPE PARSING", the disclosure of which is expressly incorporated by reference herein in its entirety.

TECHNICAL FIELD

This disclosure relates generally to the field of source code analysis. More specifically, this disclosure relates to identifying variable types of variables within the source code.

BACKGROUND

Developing software applications can be a complex process and often programming errors, or bugs, are introduced during the design and/or development of the software. In some cases, the bugs occur due to flaws in the design of the software. In other cases, the bugs occur due to errors in implementation of the software design. Regardless of the source of bugs, identifying the existence of the bugs and locating the source of the bugs can be a time-consuming and costly exercise.

Some organizations perform minimal application testing. These organizations often release software with a number of bugs because, for example, the high cost of identifying and fixing the bugs is considered too high by the organizations. While releasing buggy software may be acceptable for some consumers or industries, this is often not the case. Thus, extensive time and resources are often expended in identifying and fixing software bugs before software is released. Often, the procedures must be repeated when new versions of the software are released as new features can sometimes introduce new bugs or reveal previously unidentified bugs. Thus, releasing new versions of software on a repeated basis (e.g., yearly) may prevent or reduce the ability of an organization to spread out the cost of software testing over time.

SUMMARY

For purposes of summarizing the disclosure, certain aspects, advantages and novel features of the inventions have been described herein. It is to be understood that not necessarily all such advantages may be achieved in accordance with any particular embodiment of the inventions disclosed herein. Thus, the inventions disclosed herein may be embodied or carried out in a manner that achieves or optimizes one advantage or group of advantages as taught herein without necessarily achieving other advantages as may be taught or suggested herein.

Certain embodiments described herein include a method for accessing variables in an application. In some cases, the method may be performed by a computing system including one or more processors. In some embodiments, the method includes accessing application source code associated with an application. Further, the method can include parsing the application source code to identify a set of variables. For each variable from the set of variables, the method can include determining a variable type of the variable. In response to determining that the variable type is a complex variable, the method can include parsing the complex variable, which in some cases can include one or more variables. Parsing the complex variable can include repeating the method for each variable of the complex variable. In response to determining that the variable is associated with a database, the method can include resolving a variable name and determining whether the variable exists in a data dictionary associated with the database. The method can further include determining metadata associated with the variable based, at least in part, on the variable type. In addition, the method can include providing an identify of the variable and the metadata for the variable to a user interface thereby enabling a user to access the variable.

In some embodiments, a non-transitory physical computer storage comprising computer-executable instructions that, when executed by one or more processors, direct a computing system to perform a method for accessing variables in an application is disclosed. In some embodiments, the method includes accessing application source code associated with an application. Further, the method can include parsing the application source code to identify a set of variables. For each variable from the set of variables, the method can include determining a variable type of the variable. In response to determining that the variable type is a complex variable, the method can include parsing the complex variable, which in some cases can include one or more variables. Parsing the complex variable can include repeating the method for each variable of the complex variable. In response to determining that the variable is associated with a database, the method can include resolving a variable name and determining whether the variable exists in a data dictionary associated with the database. The method can further include determining metadata associated with the variable based, at least in part, on the variable type. In addition, the method can include providing an identify of the variable and the metadata for the variable to a user interface thereby enabling a user to access the variable.

BRIEF DESCRIPTION OF THE DRAWINGS

Throughout the drawings, reference numbers are re-used to indicate correspondence between referenced elements. The drawings are provided to illustrate embodiments of the inventive subject matter described herein and not to limit the scope thereof.

DESCRIPTION OF EMBODIMENTS

Introduction

Testing a software application, or application, can be a time-consuming complex process. The complexity of testing the application can be compounded when the software application is designed to interact with a database. Often, testing the application requires seeding one or more variables in the application and/or one or more entries in the database with known data. Seeding variables with data can be a laborious process, particularly if the application must be executed for a period of time before data is supplied to particular variables.

Often, one or more users who test the application (e.g., testers) may differ from users who created the application (e.g., software developers). This difference in personnel can further complicate testing the application because the testers may not be as knowledgeable of the application's design and/or variables as the software developers who originally created the application. This problem of lack of familiarity with the source code may be further exacerbated if the application is based on legacy code written by former employees of an organization who are no longer available to assist the testers.

As used herein, the term "variable" can include variables that may be defined in any portion of an application. For example, the term "variables" may refer to variables defined in a package, a library, as an argument to a program, or in any other portion of an application. Further, as described in more detail below, the term "variable" can include any type of variable.

Example Application Test Environment

Figure 1:
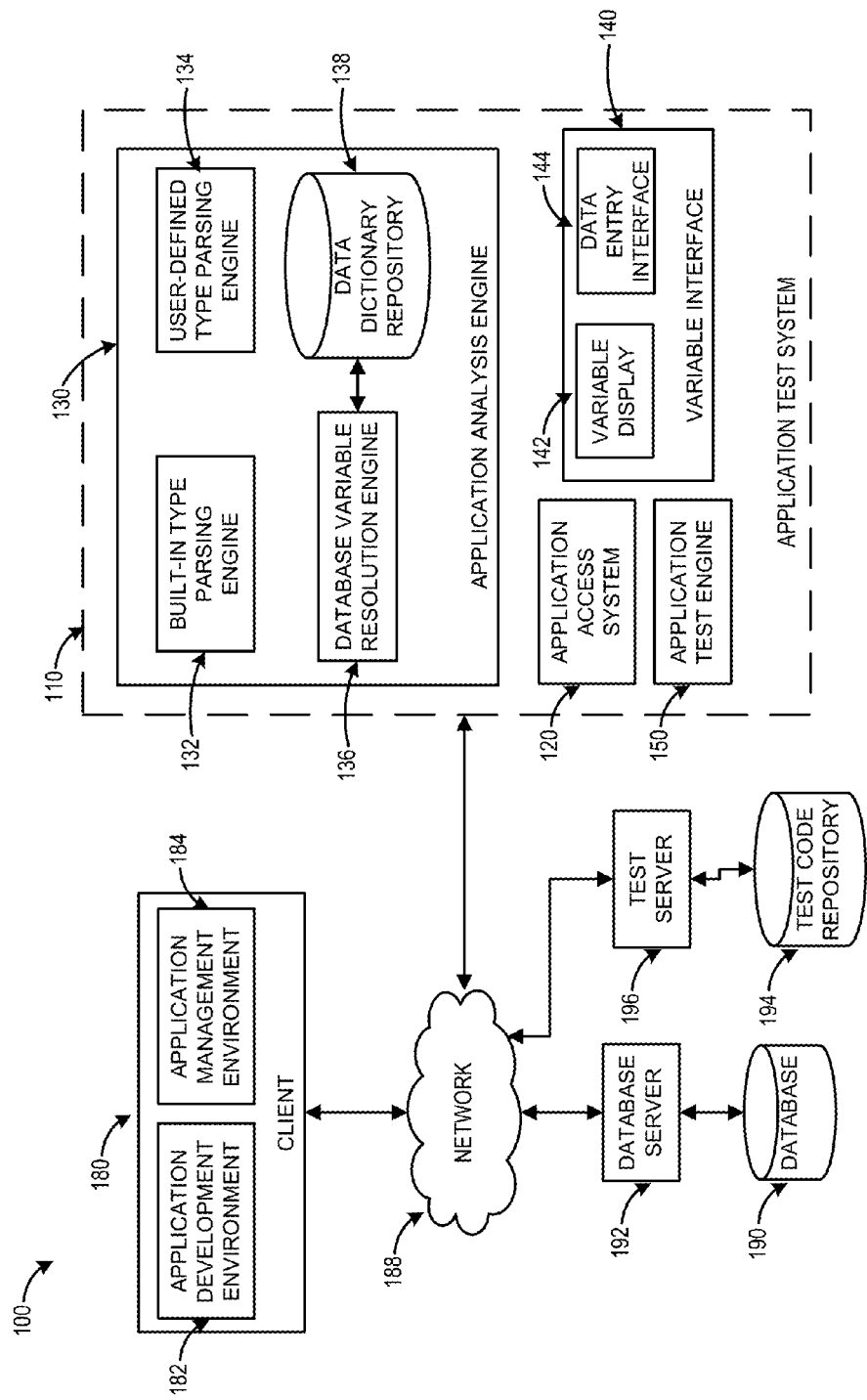
FIG. 1 illustrates an embodiment of an application test environment.

FIG. 1 illustrates an embodiment of an application test environment 100 in accordance with the present disclosure. The application test environment 100 can include an application test system 110, which can include any type of system that can facilitate the testing of an application. As illustrated in FIG. 1, the application test system 110 can be a separate system that can communicate with one or more computing devices, such as client 180, either directly or via a network 188. Alternatively, the application test system 110 may be included by the client 180, a server (not shown), or any other computing device that can host the application test system 110. The network 188 can include any type of wired or wireless network. For example, the network 188 can be a LAN, WAN, or the Internet, to name a few.

Using the application access system 120, the application test system 110 can access an application provided by the client 180, or any other system that may provide an application for test to the application test system 110. The application access system 120 can include any system that can access an application. For example, the application access system 120 can be an interface system configured to receive a copy of the application or a link to the application from the client 110. Further, in some embodiments, the application access system 120 can be used to access some or all of an application located on a separate computing device. For example, if an application to be tested includes a database 190 hosted by a database server 192, the application access system 120 may be configured to access the database 190.

The application test system 110 of FIG. 1 also includes an application analysis engine 130. The application analysis engine 130 includes any system capable of parsing and analyzing an application to identify one or more variables used by the application. In certain embodiments, the application analysis engine 130 can identify any type of variable including, for example, scalar variables, primitive variables, complex variables, user-defined variables (e.g., objects defined by the application), built-in type variables (e.g., integers, strings), and the like. Further, in certain implementations, the application analysis engine 130 can identify scalar and/or complex variables defined by or included as part of a software development kit (SDK), library, or other system that may interface with an application of that can be used to help create the application.

In some implementations, the application analysis engine 130 can identify variables used in a database associated with the application. Such variables may be included in the database programming, which may use, for example, Structured Query Language (SQL) or a variant thereof, such as Procedural SQL (PSQL), Procedural Language SQL (PL/SQL), or SQL/Persistent Store Module (SQL/PSM). The database can include any type of database including a relational database (e.g. Oracle Database from Oracle Corporation of Redwood Shores, Calif. or Microsoft SQL Server from Microsoft Corporation of Redmond, Wash.).

In addition to identifying the variables, in certain embodiments, the application analysis engine 130 can identify metadata associated with the variables. This metadata can include any information that can be associated with a variable, including, for example, the size of the variable, where the variable is used in the application, whether the variable is limited to a particular package or object within the application, a default value associated with the variable, and the like.

In some implementations, the application analysis engine 130 can include a built-in type parsing engine 132, a user-defined type parsing engine 134, a database variable resolution engine 136, and a data dictionary repository 138. The built-in type parsing engine 132 can generally include any system that can identify variable types that are defined by, built-in to, or native to the programming language used to create the application. For example, if the application is created in C, then the built-in types can include, e.g., int, char, and double. Similarly, if the application is created in Java, then the built-in types, or primitive data types, can include, e.g., byte, int, and boolean.

The user-defined type parsing engine 134 can generally include any system for identifying user-defined variables, or variable types that are defined by a user. Typically, user-defined variables are complex or composite variables, however, in some embodiments, the user-defined types can include scalar variables or primitive variables that hold a single value. Complex or composite variables are variables that may include more than one value at a time. For example, arrays, records, and vectors are examples of composite variables. Further, in some embodiments, the complex or composite variables may include one or more variables of the same type or, in some cases, of a different type. For example, a struct in the C programming language may include a number of variables, each of which can be a scalar variable or a complex variable. In some cases, user-defined variables include a number of built-in type variables. Thus, for example, a user-defined variable created using a struct may include two int variables and another struct, which, for example, may include an int and a double.

Moreover, in some embodiments, the complex or composite variables may include entities or constructs that include variables as well as other programming elements, such as methods or functions. For example, the complex variables may include objects as used in object-oriented programming languages.

In some embodiments, the user-defined type parsing engine 134 can include a parser configured to parse the source code and to identify or distinguish the variables from the other elements of the source code. For example, the user-defined type parsing engine 134 can include the QP5 Parser from Quest Software of Aliso Viejo, Calif.

The database variable resolution engine 136 can generally include any system that can resolve the name of variables, data types, or data elements that may be defined inside a database. These variables can include variables defined in the database programming, which can be written in any database programming language (e.g., SQL, PL/SQL, or SQL/PSM). Advantageously, in certain embodiments, the inclusion of the database variable resolution engine 136 enables the application test system 110 to facilitate the test of applications that use or include a database system. In some embodiments, the database variable resolution engine 136 can include a name resolving engine, or a name resolution engine (e.g., an Oracle name resolving engine), for resolving a variable to determine its full name or path.

The data dictionary repository 138 may include any type of repository or data store that includes metadata associated with each variable, data type, or data element associated with a particular database implementation. In certain embodiments, the data dictionary repository 138 may include both user-defined variables and built-in variables, data types, or data elements associated with a particular database application (e.g., Oracle Database or Microsoft SQL Server). In some implementations, the database variable resolution engine 136 can communicate with and/or work in conjunction with the data dictionary repository 138 to resolve and identify variables associated with the database portion of an application.

The application analysis engine 130, using one or more of the built-in type parsing engine 132, the user-defined type parsing engine 134, the database variable resolution engine 136, and the data dictionary repository 138 can identify and enable access to any variable of an application. In some implementations, this access can include viewing the content of a variable, setting or providing values for the variable, or both.

In addition to the application analysis engine 130 and the application access system 120, the application test system 110 may include a variable interface 140 and an application test engine 150. The variable interface 140 can generally include any system for accessing one or more variables of an application, including variables that may be defined in a database 190 that is associated with the application. The variable interface 140 may include a variable display 142 and a data entry interface 144. The variable display 142 includes any display that can present or display variables and associated metadata identified by the application analysis engine 130 to a user. In some embodiments, the variable display 142 may include a physical display, such as a monitor, television, or other display device, including a mobile display device (e.g., a tablet or a smartphone). Further, the variable display 142 may include any type of interface element for displaying the variables and metadata to the user. For example, the variable display 142 may include a table, window, list box, or the like. In some implementations, the variable display 142 may provide the identified variables and associated metadata to the client 180, which can present the variables and associated metadata to the user.

In certain embodiments, the data entry interface 144 enables a user, such as an application tester, to provide values for variables. Advantageously, in certain embodiments, the ability to provide values or seed variables enables an application tester to more efficiently test application features without running the application through its normal use to set test conditions. Further, in certain embodiments, an application tester, or other user, can use the data entry interface 144 to more efficiently add or edit large volumes of data compared to execution of the application as designed for the end user.

The application test engine 150 can include any system for executing and performing tests on an application. In certain embodiments, an application tester can seed one or more variables of an application with data and then use the application test engine 150 to test the execution of the application with the provided data. Further, the test engine 150 may include testing code that may perform tests on the application under test. In some implementations, the testing code may be stored at the application test system 110. In other implementations, the testing code may be stored at a test code repository 194 that can be accessed via a test server 196. The test code repository 194 may include multiple instances of test code. In such cases, the test engine 150 may identify the test code to use on the application source code of the application based on the application and/or one or more pieces of metadata associated with the application. This metadata may include, for example, the type of scheduled test, the tester implementing the test, the stage in the application development process, etc.

In some cases, the application test engine 150 may use embodiments described herein, such as the process 200 described below, to identify the types of variables in the application under test. In some such cases, the application test engine 150 can determine whether the identified variable types match the variable types expected by the testing code. The testing code may expect variables of the application under test to be a particular type based on information provided by a user, based on a prior performance of a variable type determination process (e.g., the process 200 described below), or a combination of the two.

The client 180 can include any type of computing device that can be used for developing, managing, or testing an application. For example, the client 180 can include a laptop, desktop, tablet, smartphone, or the like. In certain embodiments, the client 180 may include the application test system 110. Alternatively, the client 180 may interact with the application test system 110 directly or via the network 188 to facilitate the test and/or management of an application.

In some implementations, the client 180 includes an application development environment 182. The application development environment 182 may include any environment for facilitating the development and/or test of an application. For example, the application development environment 182 may include Toad from Quest Software or Visual Studio from Microsoft Corporation. In some cases, the application development environment may include and/or interact with the application test system 110.

In the illustrated embodiment of FIG. 1, the client 110 also includes an application management environment 184. The application management environment 184 can include any environment for managing an application including an application associated with a database. For example, the application management environment 184 may include Toad from Quest Software. In some embodiments, the application management environment 184 may be included as part of the application development environment 182.

To simplify the drawing, connections between the various components of the application test system 110 are omitted. However, one skilled in the art will recognize that each of the components of the application test system 110 can be configured to be in communication with any of the other components of the application test system 110.

Example Deep Type Parsing Process

Figure 2:
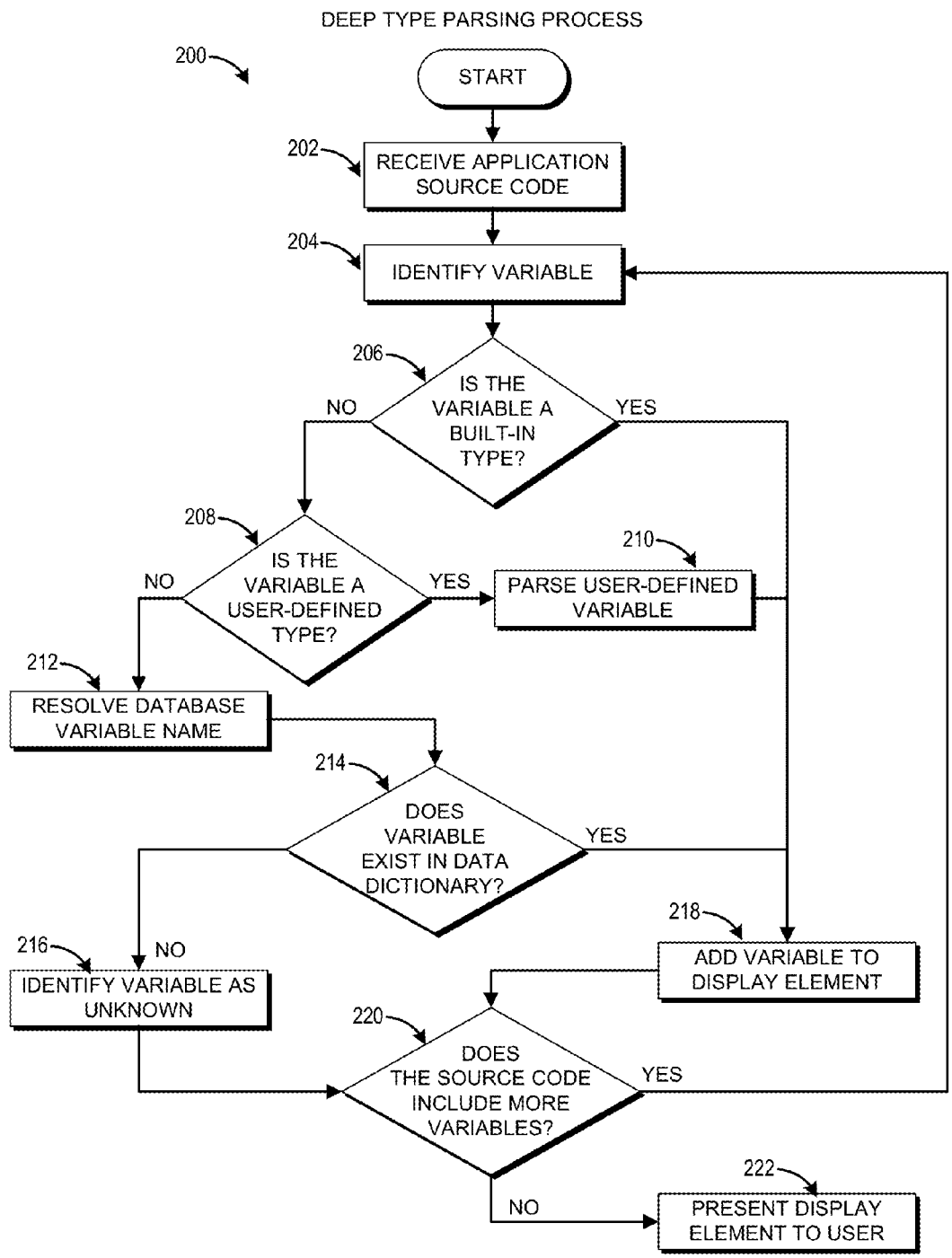
FIG. 2 presents a flowchart of an example of a deep type parsing process.

FIG. 2 presents a flowchart of an example of a deep type parsing process 200 in accordance with the present disclosure. The process 200 can be implemented by any system that can parse and analyze an application to identify the variables used within the application and that can provide a user with access to the variables. For example, the process 200, in whole or in part, can be implemented by one or more of the application development environment 182, the application test system 110, and the application analysis engine 130. Although any number of systems, in whole or in part, can implement the process 200, to simplify discussion, the process 200 will be described with reference to specific systems.

The process 200 begins at block 202, where, for example, the application analysis engine 130, using the application access system 120, receives the source code of an application. The source code may be received from the client 180 or any other computing system that can provide the application analysis engine 130 with access to the source code. In certain embodiments, a copy of the source code may be provided to the application analysis engine 130. Alternatively, the application analysis engine 130 obtains access to the source code at block 202 without receiving a copy of the source code. For example, the application analysis engine 130 may receive a link to the location of the source code on the client 180. In some cases, the application analysis engine 130 may receive a portion of the application source code. For example, the application analysis engine 130 may receive a particular package, set of classes, or set of source code files to analyze without receiving access to the entire application. Alternatively, the application analysis engine 130 may receive access to the entire application source code, but may be configured to analyze a portion of the source code.

At block 204, the application analysis engine 130 identifies a variable from the application source code. Identifying the variable can include parsing the source code to distinguish between variables and other programming constructs, such as loop statements and method declarations. In certain embodiments, the application analysis engine 130 may be configured to identify a particular subset of variables. For example, the application analysis engine 130 may be configured to identify only global variables, private variables, public variables, scalar variables, non-scalar variables, variables with default values, variables without default values, combinations of the same, and the like.

At decision block 206, the application analysis engine 130 using, for example, the built-in type parsing engine 132 determines whether the identified variable is a built-in type, such as an int or char in the C programming language. In certain embodiments, to determine whether the variable is a built-in type, the application analysis engine 130 determines the programming language used to create the application. The application analysis engine 130 can then determine whether the identified variable is of a built-in type used in the programming language.

Some applications are written using multiple programming languages, thus, the application analysis engine 130 may, in some cases, identify each of the programming languages used to create the application. In certain implementations, the application analysis engine 130 identifies the programming language used to write the section of code that includes the variable, or the first declaration or use of the variable, from the multiple programming languages used to create the application. Therefore, in certain embodiments, the application analysis engine 130 can determine if the identified variable is of a built-in type for the programming language used to create the portion of the application that includes the identified variable.

If the application analysis engine 130 determines that the identified variable is not a built-in type, the application analysis engine 130 using, for example, the user-defined type parsing engine 134, determines whether the variable is a user-defined type at decision block 208. Determining whether the variable is a user-defined type may include parsing the source code, or a subsection of the source code, to determine where the variable type of the identified variable is first defined. If the variable is identified as a user-defined type, the application analysis engine 130 parses the user-defined variable at block 210. As described above, generally, a user-defined variable type may include a number of variables. In some embodiments, block 210 can include performing process 200 for each variable of the identified user-defined variable type. In some cases, one or more variables of the user-defined variable type may also be user-defined variable types. In such cases, the process 200 may be repeated for each of the variables until a built-in variable type is identified for each variable. Thus, in some embodiments, the user-defined variable type can be described as a tree with each node representing a user-defined variable and each leaf representing a built-in type.

If the variable is not identified as a user-defined type at decision block 208, the application analysis engine 130 using, for example, the database variable resolution engine 136 attempts to resolve the identified variable as a database variable name at block 212. In some embodiments, resolving the database variable name can include identifying the full variable name path for the identified variable. At decision block 214, the application analysis engine 130 determines whether the identified variable exists in a data dictionary. This determination can include accessing the data dictionary repository 138 and determining whether the resolved database variable type exists in the data dictionary repository 138.

If the application analysis engine 130 is unable to resolve the identified variable at block 212 or if the resolved database variable does not exist in the data dictionary, the application analysis engine 130 identifies the variable as an unknown type at block 216. Identifying the variable as an unknown type can include presenting the variable to the user with a warning or a message that the application analysis engine 130 was unable to identify the variable type.

If the application analysis engine 130 determines that the variable is a built-in type at decision block 206, is a user-defined type at decision block 208, or is a database variable or data type at decision block 214, the application analysis engine 130 adds the variable to a display element (e.g., variable display 142, or a display associated with the client 180) at block 218. Adding the variable to the display element can include adding the variable name and other metadata associated with the variable to the display element. As described above, this metadata can include any information associated with the variable, such as the variable size or a default value. The display element can include a display window, text box, list, table, or any other element that can be configured to present the variable and associated metadata to the user.

Further, in some embodiments, if the variable is a complex variable that includes multiple variables or levels of variables, the display element can present the complex variable in a tree format, similar to a tree data structure, illustrating each element or variable of the complex variable. In such a format, the initial or parent complex variable can represent the initial or root node of the tree. Each complex variable, if any, of the parent complex variable can represent an internal node or child of the parent node in the tree. Generally, these internal nodes may have child nodes representing other complex variables or built-in type variables that are included in the complex variable of the internal node. In some cases, these internal nodes may be considered the root node of a sub-tree. Each built-in type variable can be represented as a leaf node or terminal node.

Figure 3:
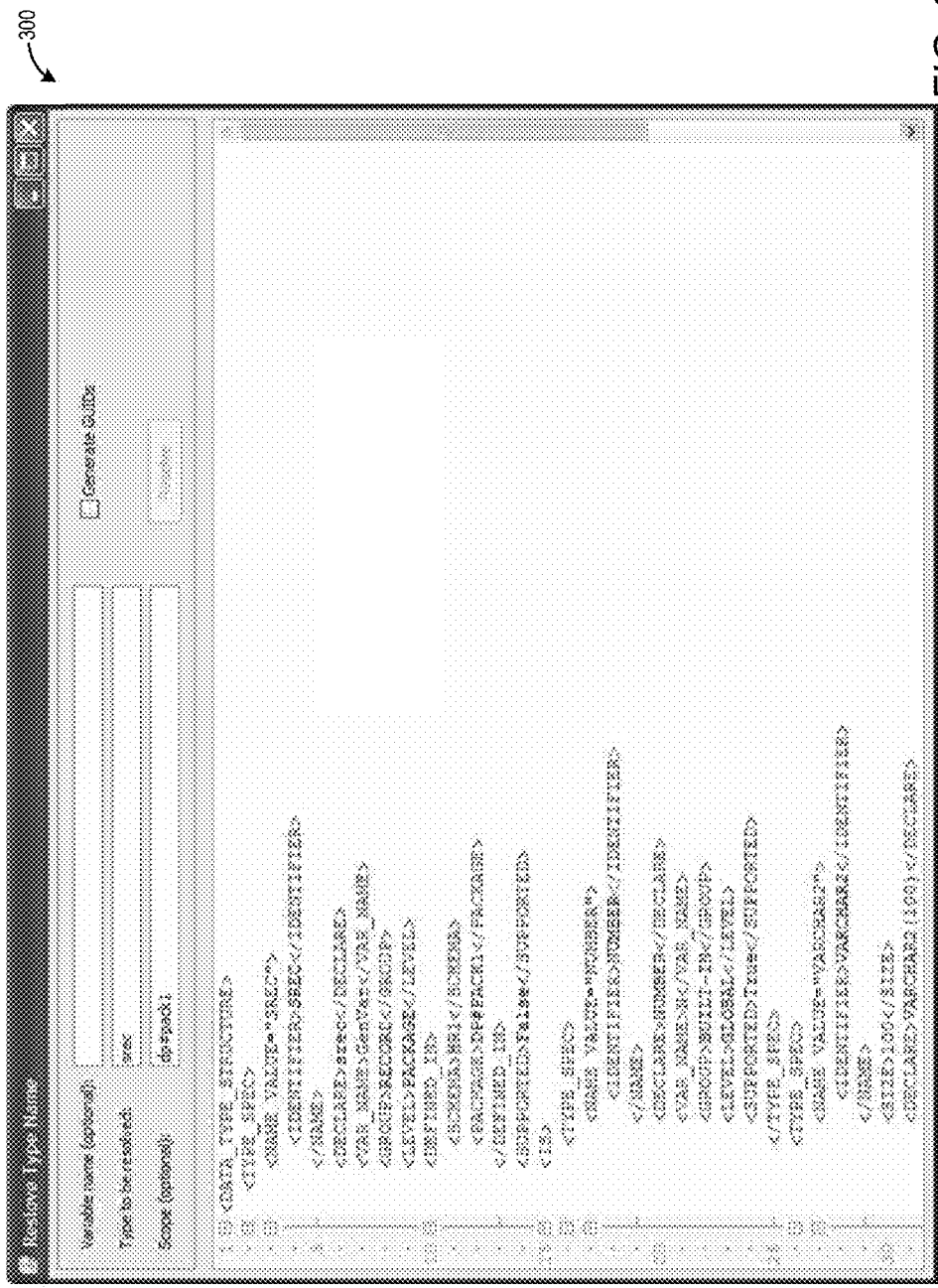
FIG. 3 illustrates one example of a variable display window that uses XML to present a variable.

In some implementations, the variable and its associated metadata can be formatted using a markup language, such as eXtensible Markup Language (XML). For example, FIG. 3 illustrates one example of a variable display window 300 that uses XML to present a variable. In this example, the variable "SREC" is a complex variable that includes a number of built-in variables (e.g., "NUMBER" and "VARCHAR2"). Thus, if represented as a tree, the variable SREC would be the root node, and the variables NUMBER and VARCHAR2 would be leaf nodes.

At decision block 220, the application analysis engine 130 determines whether the source code includes more variables. If so, the application analysis engine 130 identifies another variable at block 204 and repeats the remainder of process 200 as described above. If the source code, or the section of the source code received or identified at block 202 does not include any additional variables, the application analysis engine 130 presents the display element to the user at block 222. Presenting the display element to the user can include presenting each identified variable and its associated metadata to the user.

In some embodiments, the user can select one or more of the variables from the display element (e.g., variable display 142) using, for example, the data entry interface 144 and can provide values for the one or more variables. Further, in some implementations by providing values for one or more variables, the user can instantiate new instances of variables. In addition, for applications that include a database, the user can provide data for the database using the data entry interface 144 to interact with the display element.

Figure 4:
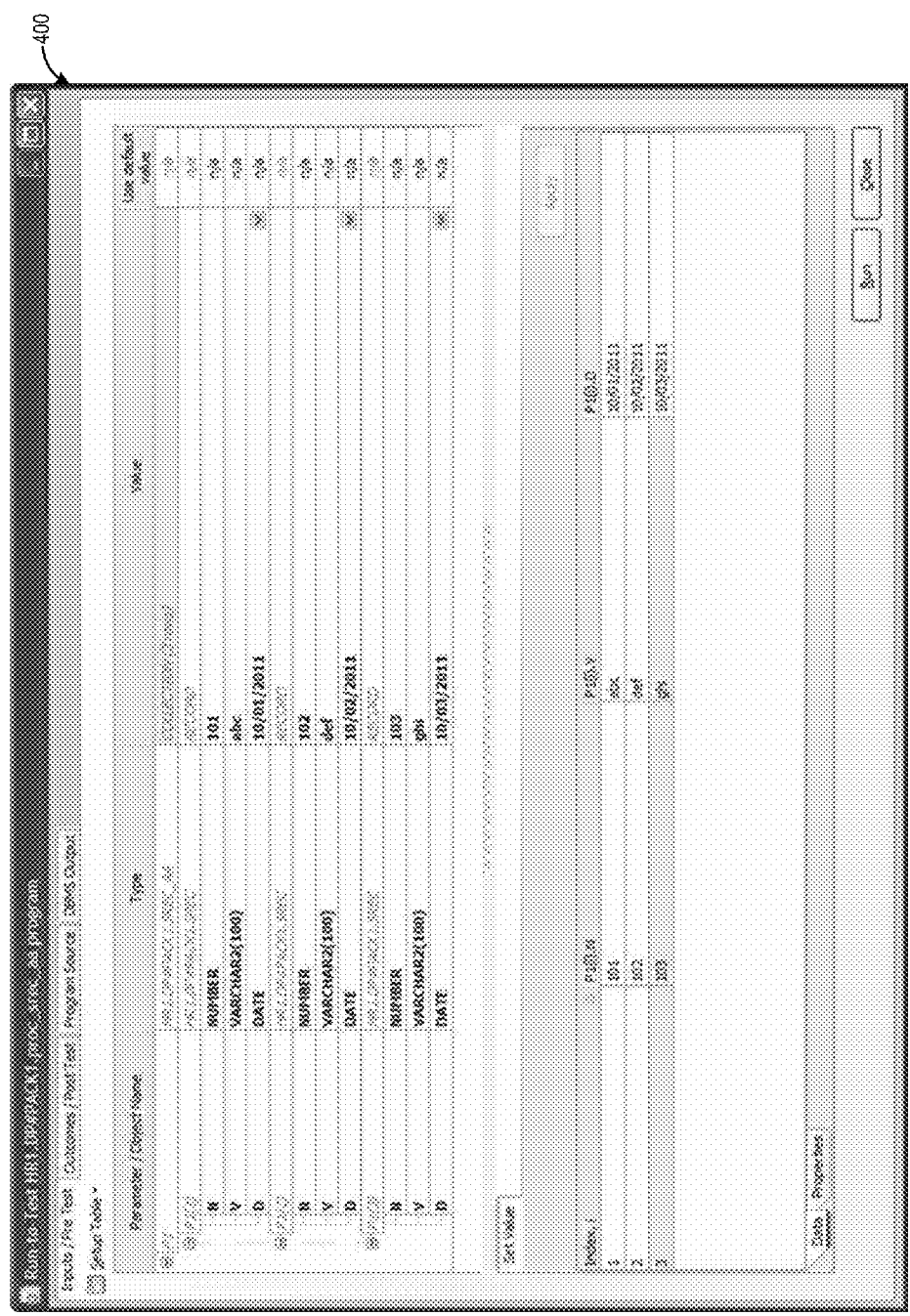
FIG. 4 illustrates one example of a data entry interface that can be used to set variable values.

FIG. 4 illustrates one example of a data entry interface 400 that can be used to set variable values. Advantageously, in certain embodiments, the data entry interface 400 enables a user to bypass any data entry screens or other data input mechanisms of an application that may or may not directly alter the values of particular variables of interest to the user. In certain implementations, the user can use the data entry interface 400 to provide values to variables identified by the application analysis engine 130. Further, using the data entry interface 400 can enable a user to seed variable values for one or more variables at a much faster rate compared to instances where the user causes the variable to obtain the variable through normal execution as designed by or implemented by the software developer. In the example, illustrated in FIG. 4, a user has provided values for three records of type SREC for a collection of type SREC_AA. Providing the values for the three records, in this example, includes providing values for the NUMBER, VARCHAR2(100), and DATE of each SREC record. In certain implementations, the values can be entered by selecting a variable and causing a data entry box to pop-up for providing the data value for the variable. In certain cases, the user can specify how many entries a non-scalar variable should include and can then provide values for each instance of or entry in the variable. As will be understood by those skilled in the art, any number of additional data entry methods may be used to provide values for selected variables. In certain embodiments, the application can be executed using the values for the variables or the data provided by the user via the data entry interface 400.

Although the process 200 has been described in a particular sequence, one skilled in the art will understand that the process 200 may be performed in a different sequence. For example, decision block 208 may be performed before decision block 206. Further, one or more operations described as part of the process 200 may be performed substantially in parallel. For instance, the decision block 206 and the decision block 208 may be performed substantially in parallel. In this example, the decision of whether to perform the operation of block 212 may be based on both the decision block 206 and the decision block 208.

Example Application Test Process

Figure 5:
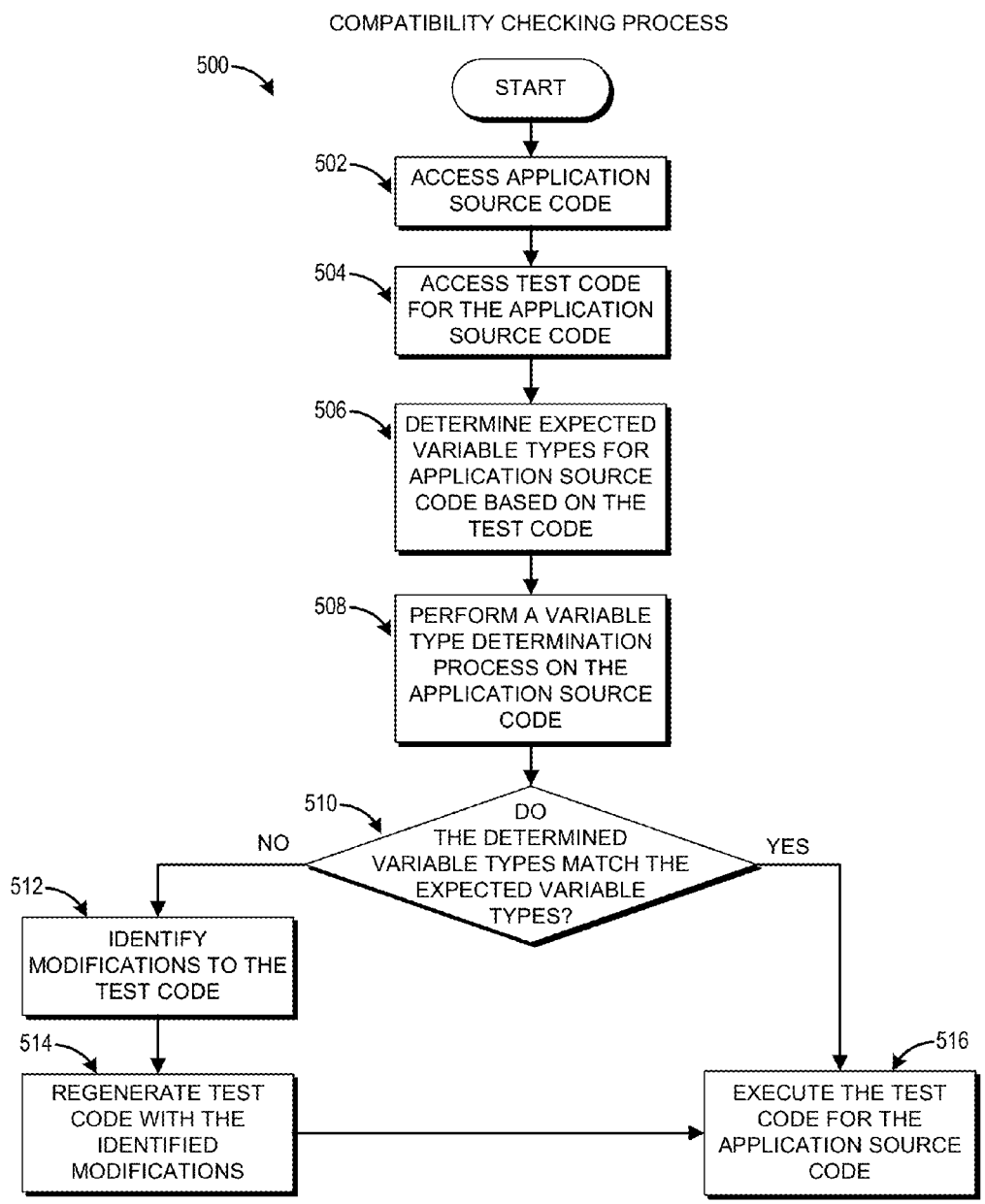
FIG. 5 presents a flowchart of an example of a compatibility checking process.

FIG. 5 presents a flowchart of an example of a compatibility checking process. The process 500 can be implemented by any system that can perform a variable type identification process and can determine whether the identified variable types match a set of variable types expected by testing code. For example, the process 500, in whole or in part, can be implemented by one or more of the application development environment 182, the application test system 110, the application analysis engine 130, and the application test engine 150. Although any number of systems, in whole or in part, can implement the process 500, to simplify discussion, the process 500 will be described with reference to specific systems.

Generally, although not necessarily, expected variable types refer to variable types that have been specified by a user or application for the application under test. For example, the expected variable types may be based on a dictionary of variables and variable types for an application submitted by a user or generated by an application. However, in some cases, the expected variable types may be determined by analyzing the source code of an application. For example, the expected variable types may be variable types that were identified during a variable type identification process, such as the deep type parsing process 200.

The process 500 begins at block 502, where, for example, the application access system 120, accesses the source code of an application. Accessing the source code of the application can include receiving a copy of the source code or a link to access the source code at a computing system (e.g., the client 102). In some embodiments, the block 502 can include some or all of the embodiments associated with the block 202.

At block 504, the application test engine 150 accesses test code for the application source code. The test code may be stored at the application test system 110, at the client 180, or at a test code repository 194 that can be accessed via a test server 196. Alternatively, the test code may be included with the application source code. The test code can include any type of code for testing and/or benchmarking the operation of an application. The application test engine 150 may identify the test code for the source code accessed at the block 502 based, at least in part, on the source code, the source of the source code (e.g., the client 180), an identifier received with or stored with the source code, metadata associated with the source code, or any other information that can be used to identify the test code. In some cases, a user (e.g., an application tester, an administrator, a software developer, etc.) may specify the test code.

The application test engine 150 can determine, for a set of one or more variables, a set of corresponding expected variable types based on the test code. Determining the set of expected variable types can include accessing a dictionary of the variables for the application source code. This dictionary may be included with the source code accessed at the block 502, or may be accessed from the test server 196 or test code repository 194. In some cases, the expected variable types may be identified from execution of a variable identification process (e.g., the process 200) performed on a previous version of the source code accessed at the block 502.

At block 508, the application test engine 150 performs a variable type determination process on the application source code. This variable type determination process can include any process for identifying the type of one or more variables of the application source code, including variables for a database component of the application. For example, the variable type determination process can include the deep type parsing process 200.

As mentioned above, in some cases, the expected variable types may be determined based on a variable identification process. In some instances, the variable identification process of the block 506 may be the same variable identification process of the block 508. In such cases, the variable identification process performed at the block 506 may be performed at some time prior to the performance of the process at the block 508 on the application source code. Alternatively, or in addition, the process performed at the block 506 may be performed on a different version of the application source code than the process performed at the block 508. In such instances, generally, but not necessarily, the application source code used at the block 506 is an older version of the source code than that used at the block 508. However, in some cases, the application source code used at the block 508 may be older. In yet other cases, there may be no chronological relationship between the application source code used at the block 506 and the application source code used at the block 508. For example, the application source code used at the block 506 may be from a different source than that used at the block 508, but may or may not have a chronological relationship.

At the decision block 510, the application test engine 150 determines whether the determined variable types identified at the block 508 match the expected variable types identified at the block 506. If the determined variable types do not match the expected variable types, the application test engine 150 identifies at block 512 one or more modifications to the test code for testing the application source code. The modifications can include changes that enable the test code to compile and/or execute the application source code. For example, the modifications can include changes to the number of parameters or parameters values that are to be provided by the test code to the compiled application. In other cases, the modifications can include changes to test routines performed by the test code, such as the number of times a portion of the test code is executed or the routines executed by the test code for a portion of the application.

At block 514, the application test engine 150 regenerates the test code with the identified modifications from the block 512. In some cases, regenerating the test code can include recompiling the test code and/or reloading the test code. In some embodiments, the blocks 512 and 514 are performed automatically. In other embodiments, a user may create one or more modifications to the test code based on the results of the decision block 510. For example, if the application test engine 150 determines at the decision block 510 that a parameter has been added to a function call, a user may modify the test code to include values for the added parameter. The application test engine 150 may then regenerate the test code automatically or in response to a user command.

In some embodiments, if the determined variable types do not match the expected variable types, the application test engine 150 rejects the application source code. In such cases, the blocks 512 and 514 may be optional. Rejecting the application source code can include informing a user that at least one of the determined variable types did not match an expected variable type. In some cases, rejecting the application source code can include presenting the user with an opportunity to modify the test code and/or one or more settings associated with the application test system 110.

After regenerating the test code, the application test engine 150 executes at block 516 the test code accessed at the block 504. Further, if the application test engine 150 determines at the decision block 510 that the determined variable types do match the expected variable types, the application test engine 150 executes the test code for the application source code at the block 516.

Generally, if at least one determined variable type does not match an expected variable type, the block 512 is performed. However, in some cases, the decision block 510 may include determining if a threshold number of determined variable types do not match the corresponding expected variable types. In such cases, the application test engine 150 may perform the block 512 if the threshold is satisfied, and may perform the block 516 if the threshold is not satisfied. In some cases, some variables may be weighted. In such cases, the number of unmatched variable necessary to satisfy the threshold may differ depending on the determined variables types that do not match the corresponding expected variable types. In some instances, a determined variable type may not have a corresponding expected variable type. For example, a new variable may have been added to the application source code of the block 502 that is not included in the source code that was analyzed to determined the expected variable types of the block 506. Variables without a corresponding expected variable may be considered as variables that do not march a corresponding expected variable type for the purpose of the decision block 510.

Although the process 500 has generally been described as identifying the variables of the application source code and comparing the identified variables with corresponding expected variables, in some cases, the process 500 may analyze a subset of variables. For example, in some cases, the process 500 may be used to check the variables for a subset of the application source code. In some embodiments, the process 500 may be limited to checking application execution parameters. In other cases, the process 500 may be used to check modified source code. Advantageously, in certain embodiments, by focusing process 500 on a subset of the application and/or a subset of variables, the execution time of the process 500 can be shortened.

Terminology

A number of computing systems have been described throughout this disclosure. The descriptions of these systems are not intended to limit the teachings or applicability of this disclosure. Further, the processing of the various components of the illustrated systems can be distributed across multiple machines, networks, and other computing resources. For example, the application analysis engine 130 and the variable interface 140 can each be implemented as separate computing systems, or alternatively, as one server or computing system. In addition, two or more components of a system can be combined into fewer components. Further, various components of the illustrated systems can be implemented in one or more virtual machines, rather than in dedicated computer hardware systems. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any subset of the components shown can communicate with any other subset of components in various implementations.

Depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Each of the various illustrated systems may be implemented as a computing system that is programmed or configured to perform the various functions described herein. The computing system may include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computing system includes multiple computing devices, these devices may, but need not, be co-located. The results of the disclosed methods and tasks may be persistently stored by transforming physical storage devices, such as solid state memory chips and/or magnetic disks, into a different state. Each service described, such as those shown in FIG. 2, may be implemented by one or more computing devices, such as one or more physical servers programmed with associated server code.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method for accessing variables in an application performed by a computing system comprising one or more processors, the method comprising:
　accessing application source code associated with an application;
　parsing the application source code to identify a set of variables, the parsing comprising distinguishing variables from other programming constructs;
　for each variable from the set of variables:
　　determining a variable type of the variable;
　　in response to determining that the variable type is a complex variable, parsing the complex variable;
　　in response to determining that the variable is associated with a database, resolving a variable name and determining whether the variable exists in a data dictionary associated with the database;
　　determining metadata associated with the variable based, at least in part, on the variable type;
　　providing an identity of the variable and the metadata for the variable to a user interface thereby enabling a user to access the variable;
　accessing test code for the application source code;
　identifying, for each variable from the set of variables, an expected variable type for the variable based on the test code;
　determining whether the variable type of each variable matches the expected variable type for the variable;
　in response to determining that the variable type of each variable matches the expected variable type for the variable, executing the test code for the application source code; and
　in response to determining that the variable type of each variable does not match the expected variable type for the variable:
　　identifying modifications to the test code;
　　regenerating test code with the identified modifications; and
　　executing the regenerated test code.

2. The method of claim 1, further comprising:
　receiving a value for at least one of the variables from the set of variables;
　setting the at least one variable to the received value; and
　executing the application.

3. The method of claim 1, wherein enabling the user to access the variable further comprises enabling the user to view metadata associated with the variable and to set value for the variable.

4. The method of claim 1, wherein parsing the complex variable comprises:
　identifying a second set of variables included in the complex variable; and
　for each variable from the second set of variables, determining a variable type of the variable.

5. The method of claim 1, wherein the identity of the variable and the metadata for the variable are presented to the user in an extensible Markup Language (XML) format.

6. The method of claim 1, wherein at least a portion of the application is configured to communicate with the database and wherein the data dictionary specifies each variable accessible by the portion of the application at the database.

7. The method of claim 1, wherein the data dictionary specifies each variable defined at the database.

8. The method of claim 1, wherein the application source code comprises a subset of the source code of the application.

9. Non-transitory physical computer storage comprising computer-executable instructions that, when executed by one or more processors, direct a computing system to perform a method for accessing variables in an application, the method comprising:
　accessing application source code associated with an application;
　parsing the application source code to identify a set of variables, the parsing comprising distinguishing variables from other programming constructs;
　for each variable from the set of variables:
　　determining a variable type of the variable;
　　in response to determining that the variable type is a complex variable, parsing the complex variable;
　　in response to determining that the variable is associated with a database, resolving a variable name and determining whether the variable exists in a data dictionary associated with the database;
　　determining metadata associated with the variable based, at least in part, on the variable type;
　　providing an identity of the variable and the metadata for the variable to a user interface thereby enabling a user to access the variable;
　accessing test code for the application source code;
　identifying, for each variable from the set of variables, an expected variable type for the variable based on the test code;
　determining whether the variable type of each variable matches the expected variable type for the variable;

in response to determining that the variable type of each variable matches the expected variable type for the variable, executing the test code for the application source code; and in response to determining that the variable type of each variable does not match the expected variable type for the variable;

identifying modifications to the test code;

regenerating test code with the identified modifications; and executing the regenerated test code.

10. The non-transitory physical computer storage of claim 9, wherein the method further comprises:

receiving a value for at least one of the variables from the set of variables;

setting the at least one variable to the received value; and executing the application.

11. The non-transitory physical computer storage of claim 9, wherein parsing the complex variable comprises:

identifying a second set of variables included in the complex variable; and for each variable from the second set of variables, determining a variable type of the variable.

12. The non-transitory physical computer storage of claim 9, wherein at least a portion of the application is configured to communicate with the database.

13. The non-transitory physical computer storage of claim 12, wherein the data dictionary specifies each variable accessible by the portion of the application at the database.

14. The non-transitory physical computer storage of claim 9, wherein the data dictionary specifies each variable defined at the database.

* * * * *